United States Patent Office 3,293,192
Patented Dec. 20, 1966

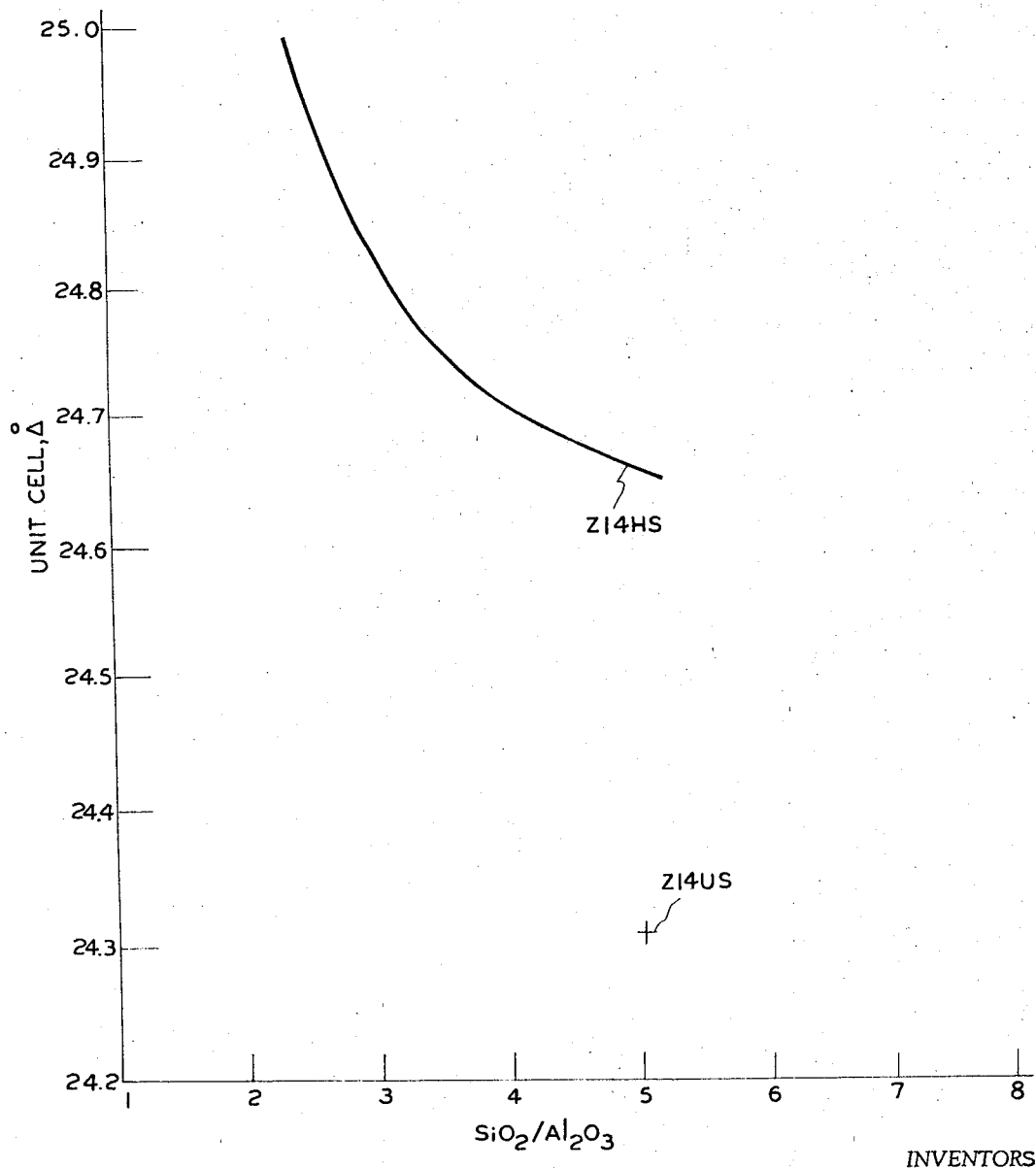

3,293,192
ZEOLITE Z–14US AND METHOD OF
PREPARATION THEREOF
Philip K. Maher, Baltimore, and Carl V. McDaniel, Laurel, Md., assignors to W. R. Grace & Co., New York, N.Y., a corporation of Connecticut
Filed Aug. 23, 1965, Ser. No. 481,669
8 Claims. (Cl. 252—430)

This application is a continuation-in-part of application Serial Number 260,298, filed February 21, 1963, and application Serial Number 318,249, filed October 23, 1963, both now abandoned.

This invention relates to new microselective zeolites that have high steam and thermal stability and to the method of preparing these ultra-stable zeolites.

The microselective adsorbents known as molecular sieves, are zeolites, that is crystalline metal aluminosilicates with a three dimensional structure of silica-alumina tetrahedra. The zeolite structure is characterized by a repeating three dimensional network of large open alumino-silicate cages interconnected with smaller uniform openings or pores. Certain of these microselective adsorbents have been prepared synthetically from sodium silicate and sodium aluminate. After synthesis, these large cavities are filled with water which can be driven off by heating without collapsing the cage. When dehydrated, these cavities can readsorb large quantities of water and other vapors at low partial pressures. Due to the uniform strictures or pore openings connecting the alumino-silicate cavities, these zeolites exhibit the unique property of excluding larger molecules from the cavity and allowing smaller molecules to pass through and be adsorbed, thereby acting as microselective adsorbents for molecules according to their size and shape.

It has been shown that adsorbents having an effective pore size of about 4 Angstrom units are of particular interest in adsorbing vapors of low molecular weight materials, such as ethane, ethylene and propylene from mixtures of the same. Other adsorbents having much larger effective pore sizes are also of interest in adsorbing large molecules and storing them for later release. These microselective adsorbents will adsorb molecules whose critical size is about 10 to 14 Angstrom units. These materials can function as carriers for a wide variety of chemical compounds. When the chemical compound is needed, it is released by heating the carrier or by displacement of the chemical with another adsorbent such as water. In addition, these zeolites also exhibit the property of base exchange, where one metal cation can be exchanged for another, allowing controlled changes in effective pore size.

There has been considerable interest in the use of these molecular sieve materials in the production of catalysts. Certain of these materials have been used in the production of hydro-cracking catalysts. So-called "metal loaded" molecular sieves, that is, molecular sieves wherein a portion of the ions have been ion exchanged with certain metals, have been suggested for use in other types of catalytic reactions in organic chemistry.

In co-pending application Serial Number 242,892, filed December 7, 1962, now abandoned, the use of these silica-alumina composites containing zeolitic materials as fluid cracking catalysts is discussed. These catalysts have been desirable cracking properties. Their cracking activity is excellent. The gas producing factors and carbon producing factors are within desirable ranges and the products recovered are those most desirable in refinery operation.

One of the principal problems encountered in incorporating these microselective adsorbents into the silica-alumina fluid cracking catalyst is their general lack of structural stability. This is very important because the regeneration cycle of a fluid cracking catalyst requires a catalyst be able to withstand steam and/or thermal atmospheres in the range of 1300–1700° F. When fluid cracking catalysts are regenerated, the temperature of the catalyst frequently reaches a high level. Any catalytic system that cannot withstand such temperature loses its catalytic activity on regeneration and its usefulness is greatly impaired. In the preparation of silica-alumina fluid cracking catalysts by conventional techniques, elaborate methods are prescribed and followed to remove the sodium from the cracking catalyst. In the preparation of synthetic 13% "active" alumina and 25% "active" alumina cracking catalysts, the level of sodium in the final product is reduced to a minimum. This is necessary because the presence of sodium in these catalysts is one of the principal causes of the lack of structural stability at high temperatures.

Most zeolites are prepared or occur naturally in the alkali metal or mixed alkali metal-alkaline earth form. In order to obtain a useful catalyst, it is important that the zeolite be structurally stable. In the use of these materials in cracking catalysts, the zeolite will comprise about 2 to 90% of the resulting composite catalysts with the preferred range being about 5 to 25%.

We have found a unique zeolite composition which is ultra stable to high temperature, thermal and steam treatment and is characterized by the fact that it has less than 1% $R_2O$ by weight where R is $Na^+$, $K^+$ or any other alkali metal ion. Another distinguishing feature of the unique zeolite composition of our invention is the unit cell size. This unit cell size is achieved by the unique stabilization step. The basic formula for our crystalline zeolite may be represented as follows:

$$XM_{2/n}O:Al_2O_3:3.5-7\ SiO_2:YH_2O$$

where M represents $H^+$ or any other cation except the alkalis and $n$ is its valence, where Y can vary from 0 to 9, and X from 0 to 1. The ultra stable zeolite can contain varying amounts of cations, other than the alkali metals or be cation-free. One particularly significant value of our product is the ultra high stability attained by elimination of the alkali metal ion and the resulting unit cell shrinkage during the stabilization step. The unique product is identified both by this smaller unit cell and the lack of alkali metal in the crystal structure.

Particularly significant points in our novel method of preparation are the intermediate calcination used to "free" the residual $Na_2O$; the extending "annealing" desired during final exchange and the final stabilization step. The chemical analysis range of our cation free form of Z–14 ultra stable product hereinafter referred to as Z–14US is as follows:

Table I

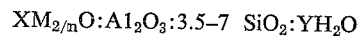

| | Percent |
|---|---|
| $SiO_2$(dry basis) | 67–80 |
| $Al_2O_3$(dry basis) | 20–33 |
| $Na_2O$(dry basis) | 0.01–1 |

We have found that during the preparation of our ultra stable zeolite product, the zeolite goes through stages in which it is in the $NH_4^+$ form and $H^+$ form and that it is finally stabilized as Z–14US, as shown by the unit cell shrinkage and high stability. Under certain conditions other cations may then be introduced to produce a highly stable cation form of Z-14US. Suitable cations include yttrium, the rare earths, aluminum, platinum, other Group VIII, IB, IIB, IIA, IIIA, IIIB, IVB,VB, VIB, VIIB, metal ions, complex amine cations etc. but not alkali metals.

Although many uses will be suggested to those skilled in the art for our novel zeolite, these products have a particularly useful application as components of catalysts because of their stability, activity and selectivity. These zeolites do not lose their crystal structure either during thermal calcination at temperatures as high as 1900° F. or steam treatment with 25% steam at a temperature of 1525° F. for 16 hours. This Z-14US product is particularly attractive as a component of a fluid cracking catalyst. Other catalytic uses would also be important.

Broadly speaking, our novel process consists of selecting a suitable zeolitic material and base exchanging the zeolite with an ammonium salt, amine salt, or other salt which on calcination decomposes to leave appreciable portions of the zeolite in the hydrogen form. This preliminary exchange reduces the alkali metal (expressed as oxide) content of the zeolite to about 1.5 to 4%. The material is then steam treated or calcined. After this treatment it is finally exchanged with an ammonium salt solution or amine salt, etc. Either during final exchange or immediately thereafter, it is desirable to age the slurry in the solution or in water for a sufficient time for annealing or healing the structure. The material is then filtered, washed and stabilized by calcination.

The first step in our process is the selection of a suitable zeolite. Our novel product can be prepared from certain of the natural and synthetic zeolites, such as the natural and synthetic faujasites. A particularly suitable raw material is the synthetic faujasite designated as Z-14HS which is described in application Serial Number 431,988, filed February 11, 1965.

The method of preparing this particular zeolitic raw material is not part of this invention. Briefly, the method described in the above application comprises the steps of preparing a silica-alumina-sodium oxide-water slurry wherein the mole ratios of sodium oxide to silica are from 0.2 to 0.8, the silica to alumina mole ratio 10 to 30 and water to sodium oxide mole ratio 20 to 60. A reactive particulate form of silica is essential in preparing these compounds.

The silica-alumina-sodium oxide-water slurry containing a reactive particulate form of silica is equilibrated or digested at room temperature or moderate temperature for a period of at least 3 hours. At the end of this aging period, the resulting mixture is heated at an elevated temperature until the synthetic zeolite crystallizes. The synthetic zeolite product is then separated and recovered. The desired product is crystallized relatively free from other zeolites. The next step of our process is the base exchange of the zeolite with an ammonium salt, amine salt or other salt which on calcination decomposes and leaves an appreciable portion of the zeolite in the hydrogen form. Examples of suitable compounds of this type include ammonium chloride, ammonium sulfate, tetraethyl ammonium chloride, tetraethyl ammonium sulfate, etc. Ammonium salts, because of their ready availability and low cost, are the preferred reagents of this step of the reaction. This exchange is carried out rapidly with an excess of salt solution. The salt may be present in an excess of about 5 to 600%, preferably about 20 to 300%. The exchange is carried out rapidly at 100° C. However, temperatures in the range of 25 to 150° C. give satisfactory results. The exchange is generally completed in a period of about 0.1 to 24 hours. This preliminary exchange reduces the alkali metal content of the zeolite. Chemical analysis of the product at this stage shows that the product contains 1.5 to 4% by weight of alkali metal. It is preferred that the $Na_2O$ content of the product at this stage contain no more than 1.5 to 2.9 weight percent alkali metal oxide.

After the preliminary exchange is completed, the zeolite is filtered, washed and dried. It is desirable that the zeolite be washed sulfate free at this stage of the process. The composite is then calcined or steamed mildly at a temperature in the range of 200–1500° F. The calcination is preferably carried out at a temperature of 300–1200° F. for a period of 0.1 to 12 hours. The calcination or steaming treatment seems to cause an internal rearrangement or transfer so that the remaining alkali metal ions are lifted from their buried sites and can now be easily ion exchanged in the next step by a mild treatment with a salt solution.

In the next step of the process, the zeolite is treated with a solution of ammonium salt or amine salt, etc. This exchange should be carried out for a period of 0.1 to 24 hours, conveniently for a period of 3 hours. It is desirable that the product be "annealed" for a period of about 1 to 3 hours, preferably 3 hours in the ammonium or amine salt solution or in water at a temperature of 25 to 150° C. At the end of this time the material is again filtered, washed thoroughly to remove all traces of sulfate and stabilized by calcination at high temperatures. It is preferable that the alkali metal oxide content of the product be no more than 0.25 weight percent prior to the final stabilization step.

Another important limitation in our process is that the product should not be dried and then stored for long periods of time prior to the final stabilization. It can be dried immediately prior to stabilization in a preheat zone of the furnace. However, if the product is to be held for any appreciable period of time, it should be held as a wet filter cake (60% total volatiles) and can be held in this condition for a period of more than 48 hours without damage. The final stabilization is achieved by heating the material to a temperature of 1300 to 1500° F. for a period of about 0.1 to 24 hours.

By the term "alkali metal" we intend to include the elements in Group IA lithium through cesium. By the term "rare earth elements" we intend to include the elements lanthanum to lutecium, atomic numbers 57 to 71.

In addition to its stability the product of our invention is characterized by the unit cell size, the water adsorption or desiccant properties, and the ion exchange capacity.

The unit cell of our novel product shrinks from the normal 24.65 Angstroms which is characteristic of the zeolite starting material. This unit cell shrinkage occurs during the final stabilization step. The magnitude of this change in unit cell size is shown graphically in the figure.

Unit cell measurements were made on our Z-14US materials and the unit cell dimensions were noted. This was done using a Norelco X-ray diffractometer with a nickel-filtered copper K radiation. The instrument was operated with 40 kv. operating potential and 20 ma. The sample to be run was mixed with about 10% of a suitable inert internal standard and scanned from about 45° two-theta to about 60° two-theta at a goniometer speed of ¼° per minute and a chart speed of ½ inch per minute. The settings for the electronic circuit panel were as follows for the first diffraction line (sodium chloride):

```
Scale factor _____ 8
Scale multiplier _____ 1
Time constant _____ 4
```

The remainder of the scan was obtained at

```
Scale factor _____ 4
Scale multiplier _____ 1
Time constant _____ 8
```

At no time during the scan was the goniometer drive or chart drive stopped.

The observed and theoretical (from National Bureau of Standards circulars) values for the internal standard were used to correct systematic errors in observed values of two-theta.

The X-ray diffraction pattern of the Z-14US material is set out in Table A:

Table A

A.
14.15
8.65
7.37
5.604
4.691
4.312
3.85
3.717
3.41
2.976
2.8
2.724
2.597

The scans received from 45° to 60° two-theta include 2 NaCl and 6 zeolite diffraction lines; observed line positions are connected from the NaCl reflections position.

Miller indicies are assigned to the zeolite reflections and unit cell values calculated using the data published in "X-Ray Diffraction Procedures" by H. P. Klug and L. E. Alexander (Wiley 1954). The determination was made by substitution in the formula:

$$a^\circ = \frac{\lambda\sqrt{h^2+k^2+l^2}}{2\sin\theta}$$

Another characteristic of our novel product resides in the water adsorption properties. The Z-14US product of this invention loses much of its desiccating properties on conversion from the Z-14HS or other raw material to the Z-14US product. The water adsorption of this material was measured at 25° C. and 10% relative humidity. The magnitude of this loss is quite large. In the measurement of the water adsorption properties of Z-14HS and our US product at 25° C. and 10% relative humidity, the Z-14HS product adsorbed 20.44, 19.41 and 19.37 grams of water per 100 grams of zeolite in three separate samples. The Z-14US product of this invention, on the other hand, adsorbed 7.14 and 6.27 grams of water per 100 grams of product. Because the ionic nature of our Z-14US product has been altered the polar adsorption sites are different.

This fact accounts for the change in water adsorption capacity at low partial pressures.

Our Z-14US product may be characterized as having a unit cell of 24.20 to 24.45 Angstrom units, a water adsorption at 25° C. and 10% relative humidity of 6 to 12 grams of water per 100 grams of zeolite.

The stability of the product is demonstrated by the surface area of the product after calcination at a temperature of 1725° F. or steam treatment with an atmosphere of 25% steam at a temperature of 1525° F. for 16 hours. Our novel product retains a surface area of greater than 150 m.²/g. after this thermal treatment and greater than 200 m.²/g. after the steam treatment described above.

These criteria distinguish this product from the Z-14HS product. The product is further distinguished from other zeolites by the chemical analysis as set out in the empirical formula. The invention is further illustrated by the following specific but non-limiting examples.

EXAMPLE I

This example illustrates a method of preparing Z-14HS zeolite which is used as a raw material in preparing our novel Z-14US product.

A solution was prepared to contain 90.6 grams of sodium hydroxide and 96.5 grams of water. A total of 52.0 grams of alumina trihydrate was dissolved in this solution. The solution was diluted with 195 grams of water. This solution was added to a paste made from 454 grams water and 219 grams of fine sized silica having a particle size of 0.02 to 10 microns. The mixture was digested at 35° C. for 5 days and then refluxed at 100° C. for 2 days. The product was filtered and washed. The product displayed the following X-ray diffraction lines:

Table B

| $d(A.)$: | $I/I_0$ |
|---|---|
| 14.6±0.3 | 100 |
| 8.9±0.15 | 34 |
| 7.56±0.06 | 22 |
| 5.75±0.05 | 40 |
| 4.81±0.03 | 12 |
| 4.41 | 20 |
| 3.95 | 10 |
| 3.81 | 48 |
| 3.34±0.02 | 46 |
| 3.05 | 11 |
| 2.947±0.010 | 19 |
| 2.882 | 44 |
| 2.794 | 18 |
| 2.661±0.05 | 18 |

162 grams of this material was reslurried with 625 grams of water containing 64.6 grams of ammonium chloride. The slurry was heated at 100° C. for 2 hours with stirring, filtered, and the exchange repeated twice more. The material was then filtered, washed thoroughly and dried. The chemical analysis of the product was as follows:

Table II.—Chemical analysis (in percent)

| | |
|---|---|
| Total volatiles | 18.22 |
| SiO₂ (dry basis) | 72.23 |
| Al₂O₃ (dry basis) | 22.61 |
| Na₂O (dry basis) | 3.14 |

One of the important improvements in the Z-14US product is the increased thermal and steam stability. The thermal and steam stability of this Z-14HS raw material was determined to furnish the basis for comparison of this material with the Z-14US product.

Thermal stability and steam stability were determined by calcining the material at various temperatures for varying periods of time, and the effect of this treatment on the surface area of the product was noted. The steam stability was determined by treating the material in the presence of steam at a designated temperature for a designated period of time. The results of these treatments are set out in Table III.

Table III

| Physical Properties After Calcining for 3 Hours | Surface Area (m.²/g.) |
|---|---|
| At 1,450° F | 660 |
| At 1,550° F | 540 |
| At 1,650° F | 72 |

It is apparent from a review of these data that the Z-14HS product is thermally stable at temperatures up to 1550° F. When the product was calcined at 1650° F. for a period of 3 hours, the structure of the material collapses as evidenced by the loss in surface area.

EXAMPLE II

Several runs were made in which the starting material was a Z-14HS Na zeolite containing about 13% Na₂O. This material had a surface area after calcination at 700° F., of 942 square meters per gram. The unit cell size was 24.653 Angstroms.

A quantity of this material was treated with an ammonium sulfate-water solution. The treating slurry consisted of 20 pounds of the zeolite, 30 pounds of ammonium sulfate, and 150 pounds of water. This treatment was carried out for a period of one hour. At the end of this time, the product was removed, washed and the sodium content of the product determined. The composition had a Na₂O content of 4.15 weight percent. This composition was again washed with ammonium sulfate solution in the same proportions as used in the first treatment. At this point, the exchange was carried out at a temperature of 100° C. for a period of two hours. The product was filtered, washed and the sodium oxide content of the product determined. The product was found to have a $Na_2O$ content of 2.2 weight percent.

This product was washed thoroughly to remove sulfate and calcined at 1000° F. for two hours. After the calcination, the product was cooled to room temperature and subjected to another ammonium sulfate exchange step. In this exchange 4.17 pounds of the zeolite were mixed with 12½ pounds of ammonium sulfate and 250 pounds of water. The exchange was continued at a temperature of 100° C. for a period of 3 hours. At the end of this time, the $Na_2O$ content of the product had decreased to 0.55 weight percent.

The exchange treatment was repeated using the same ratio of reactants as the previous exchange. The exchange was carried out for a period of one hour at a temperature of 100° C. At the end of this time, the product was sampled and the $Na_2O$ content determined. It was found that the $Na_2O$ content of the product was 0.32 weight percent $Na_2O$. The product was then calcined for 3 hours at 1500° F. The surface area of this material as determined by the well-known Brunauer-Emmett-Teller method (S. Brunauer, P. Emmett and E. Teller, J. Am. Chem. Soc. 60, 309 (1938)), was 438 square meters per gram. The unit cell of this material was 24.29 Angstroms. This shrinkage of the unit cell characterized the material as the Z-14US product.

EXAMPLE III

The X-ray diffraction pattern of the Z-14US material was determined. The X-ray powder diffraction pattern is set out below:

A.

14.15
8.65
7.37
5.604
4.691
4.312
3.85
3.717
3.41
2.976
2.8
2.724
2.597

There are certain obvious differences in the X-ray diffraction patterns of the Z-14HS (designated type Y by the Linde Division of Union Carbide Corporation) and the Z-14US zeolite. These differences are most pronounced in the lines below 2.970 A.

EXAMPLE IV

Another sample of the starting material of Example II was treated as in Example II. The treatment prior to the first calcination at 1000° F. was identical to the product of Example II. The product had an $Na_2O$ content of 2.2 weight percent.

The product was washed thoroughly to remove sulfate and calcined at 1000° F. for 2 hours. After the calcination the product was again exchanged with ammonium sulfate. In this exchange 4.17 pounds of zeolite, 12.5 pounds of ammonium sulfate and 250 pounds of water were stirred together for a period of 3 hours at a temperature of 100° C. The exchange was repeated as in Example II using the same ratio of reactants. The second exchange was continued at 100° C. for a period of one hour.

After the second exchange, the $Na_2O$ content of the product was found to be 0.93 weight percent. The product was then calcined for 4 hours at 1500° F. The unit cell size of the product was 24.309 Angstroms.

The improved stability was demonstrated by calcining a portion of this product at a temperature of 1800° F. and determining the surface area after calcination. The surface area was found to be 378 square meters per gram. When this data is compared with the data presented in Table III of Example I, it shows the improved stability of our Z-14US product. The product of Example I collapsed on calcination at 1650° F. Our Z-14US product was stable after calcination at 1800° F. was evidenced by the surface area of the material.

EXAMPLE V

Three additional runs were made to determined whether the preliminary exchange would give a satisfactory product when the exchange was carried out for a period of one hour.

In this run, the starting material was the same starting material as in Example II. The Z-14HS Na composition had a $Na_2O$ content of 13%, a surface area of 700 square meters per gram and a unit cell size of 24.653 Angstroms. This material was exchanged with ammonium sulfate by mixing 20 pounds of the zeolite, 30 pounds of ammonium sulfate and 150 pounds of water at a temperature of 100° C. for a period of one hour. When the $Na_2O$ content of a sample of this material was determined it was found to be 4.25 weight percent.

This composition was subjected to a second exchange using the same quantity of reactants. The exchange was again carried out for a period of one hour at a temperature of 100° C. At the end of this treatment, a sample of the composition was analyzed and found to contain 2.56 weight percent $Na_2O$. This product was then washed thoroughly to remove sulfate and calcined for 4 hours at 1000° F. The calcined product was again exchanged as in Examples II and IV. Exchange was carried out by mixing 4.17 pounds of the zeolite, 12.5 pounds of ammonium sulfate and 250 pounds of water for a period of 3 hours at a temperature of 100° C. The sodium content after this third exchange is set out in the table below. This material was subjected to a fourth exchange using the same conditions and followed by calcination for a period of 4 hours at a temperature of 1500° F. This final stabilization step yields our finished product. The finished product was identified by unit cell size and evaluated as to its thermal stability by heating separate samples at temperatures of 1725° F. and 1900° F. These data are presented in the table below.

*Table IV*

| Run | A | B | C |
| --- | --- | --- | --- |
| $Na_2O$ content after 3rd exchange in Wt. Percent | 0.23 | 0.21 | 0.18 |
| $Na_2O$ content after 4th exchange in Wt. Percent | 0.11 | 0.105 | 0.19 |

PROPERTIES AFTER FINAL CALCINATION

| | | | |
| --- | --- | --- | --- |
| Unit size in A: of finished product | 24.287 | 24.299 | 24.329 |
| Surface area in m.²/g. after calcination at 1,725° C | 460 | 571 | 535 |
| Surface area after calcination at 1,900° F. in m.²/g | 287 | 309 | 244 |

The unit cell size clearly distinguishes this composition as the Z-14US zeolite. The surface area after calcination at 1900° F. proved the extreme thermal stability of the Z-14US product.

EXAMPLE VI

A run was completed which illustrates the importance of reduction of the $Na_2O$ content of the product to a minimum prior to final calcination. In this run, the starting material was the $Na^+$ form zeolite containing 13% $Na_2O$. The composition had a surface area after calcination at 700° F. of 885 square meters per gram and a unit cell size of 24.625. This material was exchanged with ammonium sulfate solution. The exchange was carried out by using 20 pounds of zeolite, 30 pounds of ammonium sulfate, and 150 pounds of water. The exchange was carried on at a temperature of 100° C. for a period of one hour. A sample of this exchange product was removed and the $Na_2O$ content was determined and found to be 2.91 weight percent. The material was washed thoroughly and calcined at a temperature of 1000° F. for 4 hours. After this calcination, the product was again subjected to an ammonium sulfate exchange using 10 pounds of zeolite, 30 pounds ammonium sulfate and 150 pounds of water. The exchange was carried out at a temperature of 100° C. for a period of 3 hours. A sample of the zeolite was removed, the $Na_2O$ content was determined and found to be 1.39 weight percent. The product was subjected to a second ammonium sulfate exchange using the same ratio of zeolite, ammonium sulfate was water as in the previous exchange. The exchange was carried out at a temperature of 100° C. for one hour.

At the end of this time, the $Na_2O$ content of the product was found to be 0.50 weight percent. This material was again exchanged with the ammonium sulfate in the ratio of 10 pounds of zeolite, 30 pounds of ammonium sulfate and 250 pounds of water for a period of one hour at a temperature of 100° C. A sample of the product was removed and analyzed. The $Na_2O$ content was found to be 0.05%. This product was calcined for a period of 4 hours at 1500° F. The surface area of the product after calcination at 1725° F. was 708 square meters per gram. The unit cell size was 24.334 A.

It is apparent from a comparison of the surface area of this material with the materials prepared in Example I that this material is superior in that it has a high surface area, after calcination at 1725° F. indicating excellent high temperature stability.

EXAMPLE VII

The importance of proper calcination and particularly the importance of final calcination at a temperature of at least 1300° F. was demonstrated in a run in which the starting material was a sodium zeolite containing 13% sodium.

The surface area of the starting material was 898 square meters per gram. This material was exchanged with an ammonium chloride solution using the ratio of 141 grams of zeolite, 65 grams of ammonium chloride and 647 grams of water in the exchange. The exchange was carried on for a period of 2 hours and then repeated for 3 additional exchanges. A sample of the product after the final exchange was analyzed and found to contain 3.14 weight percent $Na_2O$.

At the end of this exchange, the material was divided into 2 portions. One portion was calcined at 700° F. and the other portion at 1000° F. Both portions were washed with ammonium chloride solution in the ratio of 60 grams of zeolite and 45 grams of ammonium chloride, and 2200 grams of water. This exchange was carried out 4 successive times. Each exchange was for a period of 1 hour at a temperature of 100° F. At the end of the exchange a sample of the composition was removed and the sodium content determined. The sodium content on the material that was calcined at 700° F. was found to be 0.43 while the sodium content of the material calcined at 1000° F. was found to be 0.197.

These data show that calcination at 1000° F. is preferable in that it reduces the $Na_2O$ content to a lower level with the same exchange treatment.

The importance of the final calcination temperature was shown by splitting both the sample that was given the preliminary calcination at 700° F. and 1000° F. into 3 separate portions. One portion of this material was calcined at 700° F., another at 1000° F. and the third at 1500° F. These products were then calcined for 2 hours at 1500° F., 1700° F., and 1725° F. The data collected in this series is set out in the table below:

*Table V*

[Surface area in $m^2/g$. as determined after calcination at 1,650° F.]

| | Preliminary Calcination at— | |
|---|---|---|
| | 700° F. | 1,000° F. |
| Final Calcination at— | | |
| 700° F. | 468 | 614 |
| 1,000° F. | 560 | 674 |
| 1,500° F. | 545 | 669 |

[Surface area in $m^2/g$. as determined after calcination at 1,700° F.]

| | Preliminary Calcination at— | |
|---|---|---|
| | 700° F. | 1,000° F. |
| Final Calcination at— | | |
| 700° F. | 54.8 | 266 |
| 1,000° F. | 19.6 | 490 |
| 1,500° F. | 413 | 569 |

[Surface area in $m^2/g$. as determined after calcination at 1,725° F.]

| | Preliminary Calcination at— | |
|---|---|---|
| | 700° F. | 1,000° F. |
| Final Calcination at— | | |
| 700° F. | 24.4 | 354 |
| 1,000° F. | 54.4 | 306 |
| 1,500° F. | 31.2 | 322 |

It is apparent from a review of the data set out in Table V that the final calcination at 1500° F. is much more important than the preliminary calcination at 1000° F. Thus the product that contained 0.443 wt. percent $Na_2O$ had a satisfactory stability on calcination up to 1700° F. When the preliminary calcination was carried out at 700° F. and the final calcination carried out at 700° F. and 1000° F., the product was unstable at 1700° F. The product that was given a preliminary calcination at 700° F. was unstable after calcination at 1725° F. even in that case where the final calcination was carried out at 1500° F. This lack of stability at temperatures above 1700° F. is a direct function of the $Na_2O$ content as is shown by a comparison of the product that was given preliminary calcination at 1000° F. and final calcination at 700° F., 1000° F. and 1500° F. This product contained 0.197 wt. percent $Na_2O$ and was stable after calcination at 1725° F. The stability on aging was determined after the sample was given a final calcination at 1000° F. The surface area of the composition after re-calcination at 1650° F. was determined after the product had been allowed to stand for a period of 7 days. The data collected in this series of runs is set out in Table VI below:

*Table VI*

[Surface area in $m.^2/g$. as determined after calcination at 1650° F.]

| Preliminary Calcination at 1000° F. | Surface Area Initially | Surface Area After Aging 7 Days |
|---|---|---|
| Final Calcination at— | | |
| 700° F. | 614 | 26.3 |
| 1,000° F. | 674 | 342 |
| 1,500° F. | 669 | 693 |

This data clearly emphasized the importance of final calcination at 1500° F. Although the product given a final calcination at 700° F. and 1000° F. was stable initially after calcination at 1650° F., the product that was given a calcination of 700° F. failed to retain the surface area after aging for a period of 7 days. The surface area of the product that was calcined at 1000° F. had decreased by a factor of almost 2. Only the product that was given a final calcination at 1500° F. retained essentially the same surface area after the 7 day aging.

EXAMPLE VIII

The importance of a low soda content of the material was shown in the series of runs in which a Z-14US product was prepared to contain 0.15% Na₂O using the techniques described previously. The surface area of this product as determined after calcination at 1725° F. was 453 square meters per gram. Varying amounts of sodium were added to this material and the sodium content was increased progressively from 0.8 to 3.9 wt. percent Na₂O. The effect of this addition of Na₂O on the surface area of the final product is set out in Table VII below:

*Table VII*

[Surface area as determined after calcination at 1725° F.]

| Weight percent Na₂O dry basis | Surface Area in m.²/g. |
|---|---|
| 0.15 | 453 |
| 0.80 | 232 |
| 1.0 | 169 |
| 2.1 | 92 |
| 3.9 | 10 |

These data show clearly that the surface area of the material, (a measure of the stability of the zeolite), drops off rapidly after Na₂O content of 1% is reached. A product with a Na₂O content of 2.1 had less than ¼ of the surface area of the original material that contained 0.15 wt. percent of Na₂O. When the Na₂O content was increased to 3.9%, the surface area of the product was only 10, indicating a complete lack of stability on calcination at 1725° F. It is apparent from these data that a Na₂O content of 1.0% is the maximum that can be tolerated in our Z-14US product.

Obviously, many modifications and variations of the invention as hereinabove set forth may be made without departing from the essence and scope thereof and only such limitations should be applied as are indicated in the appended claims.

What is claimed is:

1. As a composition of matter a synthetic ultra stable zeolitic aluminosilicate having the composition expressed in terms of oxide mole ratios as follows:

$$XM_{2/n}O:Al_2O_3:3.5-7SiO_2:YH_2O$$

where M represents at least one cation having a valence of not more than 4 and $n$ is the valence of M, X may vary from 0 to 1 and Y may be any value up to 9, said zeolite being characterized by an alkali metal content of less than 1%
a cubic cell size of 24.2 to 24.45 A.
an X-ray diffraction pattern essentially the same as shown in Table A
and an ultra stable structure as evidenced by retention of a surface area of greater than 150 m.²/g. after calcination at a temperature of 1725°F. for a period of 2 hours.

2. The composition of claim 1 wherein M is H⁺.

3. The composition of claim 2 wherein a portion of the hydrogen ions have been replaced by an ion selected from the group consisting of NH₄⁺, complex amine cations, yttrium ion, the rare earth ions and Group IB, IIA, IIB, IIIA, IIIB, IVB, VB, VIB, VIIB and VIII metal ions.

4. A process for preparing a synthetic ultra stable zeolite which comprises successively base exchanging a crystalline zeolite having an X-ray diffraction pattern essentially the same as shown in Table B, with a solution of at least one salt selected from the group consisting of ammonium and complex amine salts until the alkali metal content is reduced to less than 5 weight percent, calcining said exchanged zeolite at a temperature of about 200 to 1500° F. for a period of about 0.1 to 12 hours, cooling the composition, successively base exchanging with a solution of at least one salt selected from the group consisting of ammonium and complex amine salts until the alkali metal content is reduced to less than 1 weight percent, calcining at a temperature of about 1000° F. to 1500° F. for a period of 0.1 to 12 hours, cooling and recovering the ultra stable zeolite product.

5. A process for preparing a synthetic ultra stable zeolite which comprises successively base exchanging a crystalline zeolite having an X-ray diffraction pattern essentially the same as shown in Table B with a solution of at least one salt selected from the group consisting of ammonium and complex amine salts, until the alkali metal content is reduced to less than 5 weight percent, washing the exchanged composite, calcining at a temperature of 1000° F. to 1500° F. for a period of 0.1 to 12 hours, cooling the composite, successively base exchanging with a solution of at least one salt selected from the group consisting of ammonium and complex amine salts until the alkali metal content is reduced to less than 1 weight percent, washing, calcining at a temperature of 1000 to 1500° F. for a period of 0.1 to 12 hours, cooling and recovering the ultra stable zeolite product.

6. The process according to claim 5 wherein the base exchange solutions are prepared from a salt selected from the group consisting of ammonium chloride, ammonium nitrate, ammonium sulfate, tetraethyl ammonium chloride and tetraethyl ammonium sulfate.

7. The process according to claim 5 wherein the zeolite is kept in contact with the base exchange solution for a period of at least one hour before final calcination.

8. The process according to claim 5 wherein the base exchange salt, in solution, is present in an excess of 5 to 600% and the exchanges are carried out for a period of 0.1 to 24 hours at a temperature of 25 to 150° C.

References Cited by the Examiner

UNITED STATES PATENTS

| 3,130,006 | 4/1964 | Rabo et al. | 23—112 X |
| 3,130,007 | 4/1964 | Breck | 23—113 |
| 3,140,252 | 7/1964 | Frilette et al. | 252—455 X |

OSCAR R. VERTIZ, *Primary Examiner.*

E. J. MEROS, *Assistant Examiner.*